United States Patent [19]

Rosenberg

[11] 4,252,591
[45] Feb. 24, 1981

[54] CORRUGATING APPARATUS AND PROCESS

[75] Inventor: David J. Rosenberg, Glen Cove, N.Y.

[73] Assignee: Pall Corporation, Glen Cove, N.Y.

[21] Appl. No.: 35,146

[22] Filed: May 2, 1979

[51] Int. Cl.³ .............................................. B29D 23/10
[52] U.S. Cl. ..................................... 156/203; 156/204; 156/218; 156/462; 156/474; 493/440; 425/396
[58] Field of Search .............. 156/461, 466, 474, 462, 156/200–203, 204; 223/37–38, 28, 34; 270/86, 94, 61 F; 210/493 R; 425/336, 303, 396

[56] References Cited
U.S. PATENT DOCUMENTS

| 1,402,584 | 1/1922 | Elrod | 223/34 |
| 2,001,709 | 5/1935 | Davidson | 156/462 |
| 3,038,718 | 6/1962 | Balsam | 270/86 X |
| 3,853,529 | 12/1974 | Boothe et al. | 210/93 R |
| 3,948,712 | 4/1976 | Stannard | 156/66 X |
| 3,956,055 | 5/1976 | Duff et al. | 156/200 X |

Primary Examiner—David A. Simmons

[57] ABSTRACT

Process and apparatus are provided for forming corrugated filter sheet by folding a long strip of sheet material into corrugations extending longitudinally of the strip, press-bending the sheet along the longitudinal fold lines of the intended corrugations; and gradually drawing in the sheet from the sides towards the center, while pushing the sheet out from each side along the fold lines, so as to form the intended corrugations, reducing the width of the sheet according to the height and width of the corrugations.

13 Claims, 8 Drawing Figures

CORRUGATING APPARATUS AND PROCESS

In order to obtain a large filter surface area within a confined volume, it is customary to corrugate filter sheet material. The corrugated filter sheets can be used in extended corrugated form, or folded into cylinders and other shapes, according to the available space limitations. In this way, the filter surface area within a limited space may be increased to two, three or more times that of a noncorrugated sheet, depending upon the number, depth and spacing of the corrugations.

The folding of a filter sheet into corrugated form has always posed unusual difficulties. Corrugating apparatus geometry has virtually required that corrugations be imposed across the shorter dimension of the sheet, i.e., widthwise or transversely of the sheet material. This is because of the wondrous complexity of the corrugating mechanism, being composed of numbers of movable paddle- or wedge-shaped elements which close in upon the sheet material from each side, compel it to travel undulatingly about their periphery, and then move close together so as to crowd the corrugation folds closely upon one another so that a large number of corrugation folds can be squeezed into a small space. To keep the movable elements manageable, they have to be as short as possible, so corrugating transversely of the sheet is the only practical possibility.

Because the fold-forming movable members and the filter sheet are both continuously in motion during the entire corrugating operation, it is very difficult to obtain folds of uniform width and depth, precisely enough imposed upon the paper so that they will all stand with respect to each other at the same angle of curvature and in the same relative position. Nonuniformity in the corrugation folds introduces nonuniformity in the flow pattern or filtration through the resulting sheet, because of course variations in width and depth of the folds change the flow patterns along their surface. Moreover, folds of greater depth have of course a greater surface area, with the result that a larger proportion of fluid can pass through such folds, in comparison with the shallower folds. The result is that corrugated filter sheets are very rarely uniform in filtration flow volume and rate from one portion of their surface to another, with concommitant variations in filtration capacity from corrugated filter element to corrugated filter element.

It should theoretically be possible to corrugate a filter sheet by passing it through a fold-former having a cross-sectional configuration corresponding to the desired corrugation folds, but as a practical matter it is impossible to compel filter sheet material to traverse such fold-formers because of the frictional drag between the filter sheet and fold-former surfaces. Filter sheet materials, particularly those with fine pores and those that are very thin, such as filter membranes, have a low tensile strength, and any frictional burden as well as a nonuniform drawing rate through the former can result either in actual tears and breaks in the filter sheet, or in the introduction of weakened areas which are susceptible to rupture under rated pressure differentials later on. Exceptionally high frictional drag is encountered in gathering the sheet in longitudinally as it is being corrugated, so that this becomes impossible, while the use of a fold former for introducing transverse corrugations is quite impractical.

The absence of a fold-former that could be used has thus frustrated development of a corrugating apparatus capable of corrugating filter sheet material longitudinally of the sheet. It is not practical to attempt to corrugate a sheet longitudinally by the use of movable paddle- or wedge-shaped elements. Even is these elements are made longer than normal, which in itself poses problems, the members necessarily have to be less long than the sheet, which means that control of the sheet before it reaches the corrugating members becomes critical, to prevent wrinkling or stretching, either of which can result in weakening or rupture of the sheet. While it is not easy to feed a sheet longitudinally to a fold-former, it has been even more difficult to feed the sheet material longitudinally to the movable elements of conventional transverse corrugators.

In accordance with the invention, a corrugating apparatus is provided for forming corrugated filter sheet by folding a long strip of sheet material into corrugations extending longitudinally of the strip, comprising, in combination:

(1) a fan-shaped fold-former drawing the sheet in from the sides towards the center and having an inlet end and an outlet end, the fold-former having an undulating configuration corresponding in cross section at the outlet end in height and width to the corrugations to be imposed on the sheet material; the undulations radiating outwardly in a fan shape and decreasing in height and increasing in width from the outlet end to the inlet end; the undulations at their inlet end being arranged in an arc described about the outlet end and having a radius of curvature corresponding to the distance from the inlet end to the outlet end of the undulations;

(2) arcuate guide means for the strip of sheet material disposed before the inlet end of the undulations and having a curvature corresponding thereto;

(3) means for feeding a long strip of sheet material to the arcuate guide means at the inlet end of the undulations at a rate sufficient to maintain the strip of sheet material at zero tension and slack throughout its width at the arcuate guide means;

(4) means before the arcuate guide means for press-bending the sheet material along the fold lines of the corrugations to be imposed, to facilitate bending along those lines in the fold-former; and (5) means disposed beyond the outlet end of the fold-former for drawing the sheet material through the former with minimum frictional drag while corrugating the sheet material therein.

The process according to the invention for forming corrugated filter sheet by folding a long strip of sheet material into the corrugations extending longitudinally of the strip comprises, in combination, the steps of:

(1) press-bending the sheet along the longitudinal fold lines of the intended corrugations; and (2) gradually drawing in the sheet from the sides towards the center while pushing the sheet out from each side along the fold lines so as to form the intended corrugations, reducing the width of the sheet according to the height and width of the corrugations.

A feature of the invention is the use of means for guiding the sheet material thorough the fold-former while conforming to the undulating configuration thereof, which means moves with the sheet material as it does so, and thereby compels conforming movement through the fold-former, and reduces frictional drag. This means also makes it possible to use an open-top former, engaging only one side of the sheet material being corrugated, thus reducing frictional drag to one surface only of the sheet material, in contrast to conventional fold-formers, which normally engage the sheet material being folded on each side, to compel it to conform to the required shape.

A further feature, which is a consequence of the longitudinal corrugations, is a substantially continuous corrugating operation, limited only by the available lengths of the sheet material. If the material is continuously formed in a preliminary stage, and is therefore endless, the corrugating process and apparatus can be operated continuously, without interruption. Thus, the invention is applicable to continuous corrugation of filter membranes which are continuously formed by extrusion, coagulation or precipitation techniques, after drying or curing of the sheet to a condition where it can be handled in the manner required for corrugation.

The apparatus can include means for folding the corrugated sheet into cylindrical form, lapping and bonding the lapped edges of the cylinder in a longitudinal side seam seal. Since both the cylinder and the side seam seal extend longitudinally of the strip, they are in effect endless and thus this can be a continuous operation in sequential conjunction with the corrugating operation.

The corrugating apparatus can also include means for packaging the corrugated filter sheet in a two-part housing adapted to receive corrugated sheet material therebetween, and will in that event include guide means for guiding the corrugated sheet between and into two such housing parts, and then attaching the parts together, with the filter sealed therein.

Inasmuch as the strip is continuously longitudinally corrugated, filter elements of any selected length can be prepared, simply by cutting off the corrugated strip in the length desired.

Preferred embodiments of the apparatus of the invention are shown in the drawings, in which.

Figure 1:
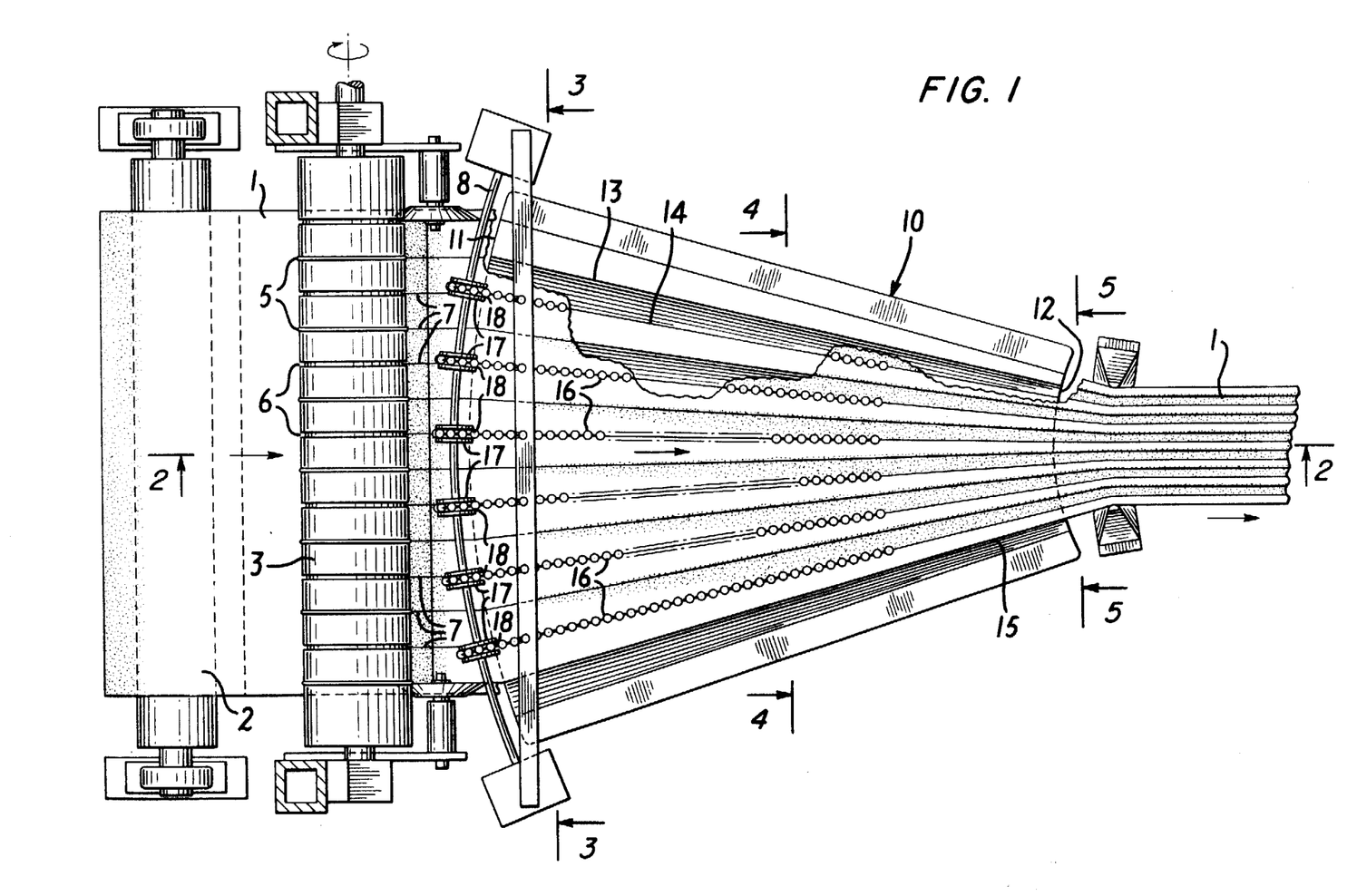
FIG. 1 represents a top plan view of a corrugating apparatus in accordance with the invention.

The corrugating apparatus shown in FIGS. 1 to 5 has a fan-shaped fold-former 10 having an arcuate periphery at the inlet end 11, where it is relatively flat, and an arcuate outlet end 12 whose cross-sectional configuration (best seen in FIG. 5) corresponds to the intended corrugated configuration of the filter sheet 1. The fold-former 10 is referred to as fan-shaped because the plurality of final corrugation folds 15 at the outlet end 12 gradually increase in height and decrease in width from the inlet end 11, resulting in an appreciably narrower outlet end 12. The corrugation folds 15 are composed of alternating peaks 13 and depressed portions 14, viewed from the top, but the peaks 13 become depressed portions 14 and the depressed portions 14 become peaks 13 when viewed from the opposite side of the fold-former, because both are displaced outwardly from the lateral centerline of the fold-former to approximately the same distance. In effect, the peaks 13 are pushed up from the centerline and the depressed portions 14 down from the centerline, with the result that the fan-shaped fold-former 10 has the same profile view from either side, and can be used for shaping the sheet with either side facing up, as shown in FIG. 1.

It will be apparent from FIG. 1 that at the same time as the corrugation folds 15 increase in height they also decrease in width, so that the distance between them diminishes, and the folds 15 themselves become narrower from the inlet end towards the outlet end. The result of this configuration is that a sheet material conforming to the surface of the former is drawn in from the sides at the same time as it is pushed up and down along the peaks and depressed portions of the former, and so gradually acquires the corrugated shape shown in FIG. 5.

While in the fold-former shown in FIG. 1 there are six peaks and six valleys to a total of twelve undulations and six corrugation folds, there can of course be any desired number and size of corrugations, according to the surface area of the filter sheet desired. The folds can moreover have any desired height and depth. The greater the height or depth, i.e., the amplitude, of the folds, the wider a sheet is required for corrugation, and the greater the difference between the width of the fold-former at the inlet end, and its width at the outlet end.

The fold-former can be made of any suitable material. Preferably, it is one presenting as low friction a surface to the filter sheet material as possible. Low-friction, i.e., slippery smooth, plastic materials such as polytetrafluoroethylene, polytrifluorochloroethylene and polyamides are preferred, but other low-friction plastic materials can be used, including polypropylene, polyethylene, polycarbonate, polyoxymethylene, and polyisobutylene. Metals can also be used, such as aluminum, stainless steel and titanium alloy. Metals are however more difficult to form into the desired fan-shaped undulating configuration, while plastic materials are readily so shaped by molding or pressing. Plastic coated metals can also be used.

In order to achieve undulations of the same length and amplitude with the gradually increasing amplitude from inlet to outlet end, a prerequisite in longitudinal corrugating, it is necessary that the inlet and outlet ends of the undulations describe an arc whose radius of curvature is equal at least to the length of the undulations from the inlet to the outlet ends thereof. The arcuate periphery of the undulations accordingly has the radius of that circle whose center is the common meeting point (obtained by extrapolation) beyond the outlet end of the center lines of the undulations of the fold-former.

The filter sheet material 1 to be corrugated in the fold-former when preformed is in strip form, and can be carried on a supply roll 2. If the sheet is being continuously formed by extrusion, coagulation, or precipitation, as in the case of filter membrane sheet, the supply is of course unnecessary, and can be omitted. A pair of driven cylindrical rolls 3,4 draw the filter sheet material off the supply roll 2 (or from the continuous sheet-forming apparatus, if used) into the bite between the rolls. These rolls are shaped with alternating ridges or raised portions 5 and grooves or depressed portions 6, with the ridges on one roll mating with and entering into the grooves on the other roll, for the purpose of impressing fold-lines 7 upon the filter sheet material 1. The spacing between the ridges 5 and the grooves 6 accordingly corresponds to the spacing of the undulations at the inlet end of the fold-former. The imposition of fold-lines greatly facilitates the folding of the filter sheet material in the former. While the ridges 5 and grooves 6 can have any shape, they are preferably rounded, and compress the filter sheet material passing therethrough only to the extent required to facilitate folding along the resulting lines imposed on the sheet, since undue compression reduces open volume and therefore porosity.

Inasmuch as the filter sheet material emerges from the rolls 3,4 in a substantially flat profile, except for the fold-lines 7, it is necessary to compel the sheet to change its profile sufficiently to enable it to bend or bow as it enters the arcuate inlet end 11 of the fan-shaped fold-former. This is accomplished by the bowed guide 8, which is spaced a short distance before the sheet reaches the arcuate periphery. To traverse the bowed guide without injury, it is important that the sheet material be loose or slack as it travels from the rollers 3,4 to the guide 8. This is accomplished by providing excess sheet material in that space and then feeding the material through the driven rolls 3,4 to the guide 8 at a rate that is the same as the drawn rate of passage of the sheet material through the fold-former 10, so that sheet material is supplied at the inlet end as fast as it passes through the fold-former, and thus the slack is maintained.

In order to compel the filter sheet material to enter the depressed portions 14 of the fold-former all the way to the base thereof, while at the same time conforming the filter sheet material closely to the peaks of the raised portions 13, it is necessary to press the filter sheet material down into the depressed portions. This is accomplished by the weight of the lengths 16 of flexible chain which by their weight aid in conforming the sheet to the undulating contour of the fold-former surface, with a low frictional drag. The chains are composed of a plurality of spheres pivotably linked by rigid bars, and with smooth surfaces so as to avoid injury to the filter sheet. The weight of the chains is sufficient to press the filter sheet closely against the surface of the fold-former, with the result that the filter sheet material enters and contacts the bases of the grooves 14 and the apices of the peaks 13 in the surface of the fold-former, from the inlet end to the outlet end, so that by the time the sheet has reached the outlet end it is in corrugated shape. As indicated, the folding about the peaks and within the bases of the depressed portions is facilitated by the preimposed fold lines 7, in the bite of the rollers 3,4.

Figure 6:
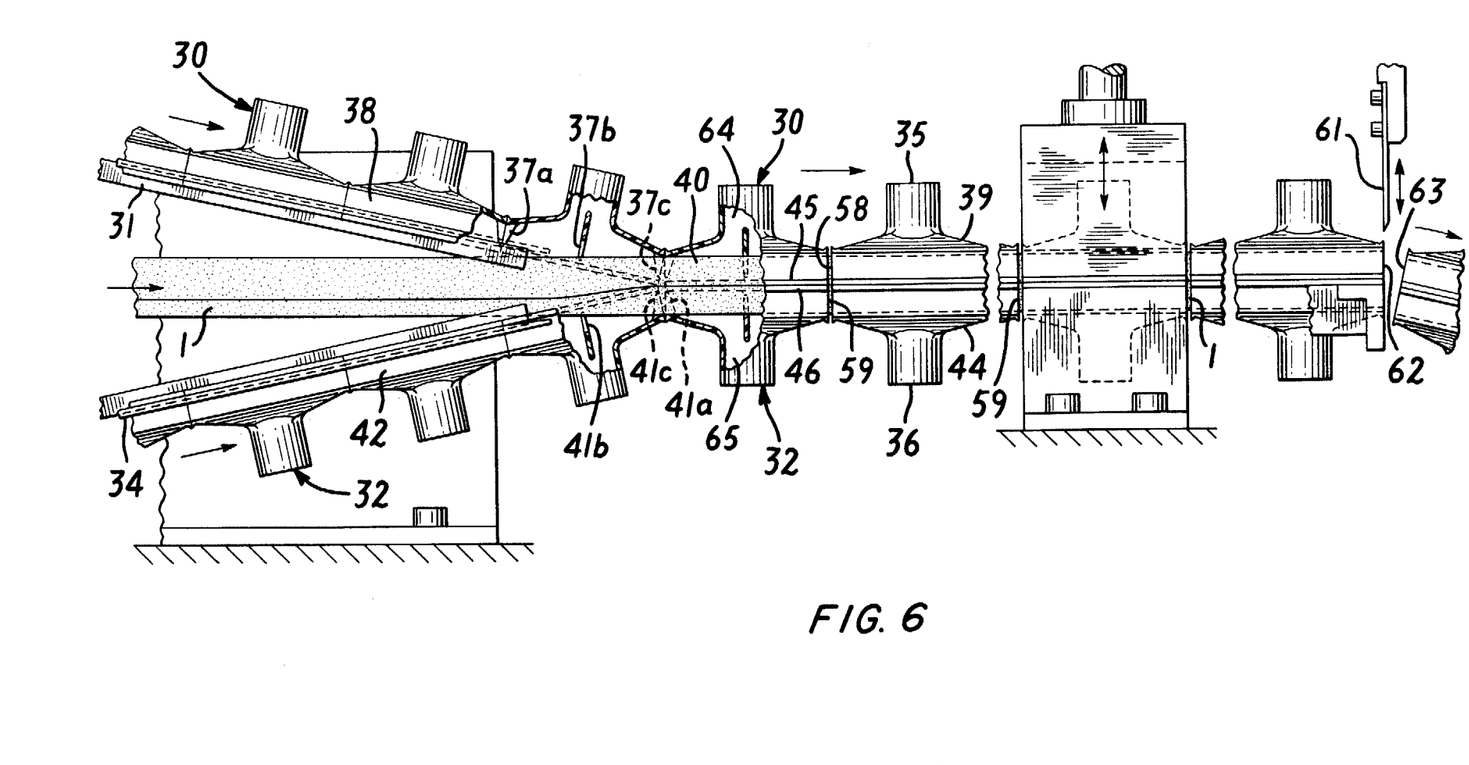
FIG. 6 shows a side view of an apparatus for sequential combination with the apparatus of FIGS. 1 to 5, for guiding the corrugated filter sheet material as obtained from the apparatus of FIG. 1 between two housing parts carrying a comb-shaped supporting structure for the corrugated filter sheet, and then sealing the filter sheet therein.

As best seen in FIG. 6, the inlet ends of the chains are anchored in the grooves 18 of the sheaves 17.

The corrugated filter sheet 1 as it emerges from the outlet end 12 of the former is corrugated, with the corrugation folds pushed tightly against each other, with only a small clearance therebetween. The corrugation folds are absolutely uniform, because of the close conformity of the sheet to the surface of the former, with the result that there are no significant variations in height or width of the folds, and the corrugated sheet material that is produced is therefore uniform in filtration characteristics throughout its surface area, unlike prior corrugated materials prepared using conventional transverse corrugators.

Figures 2, 7:
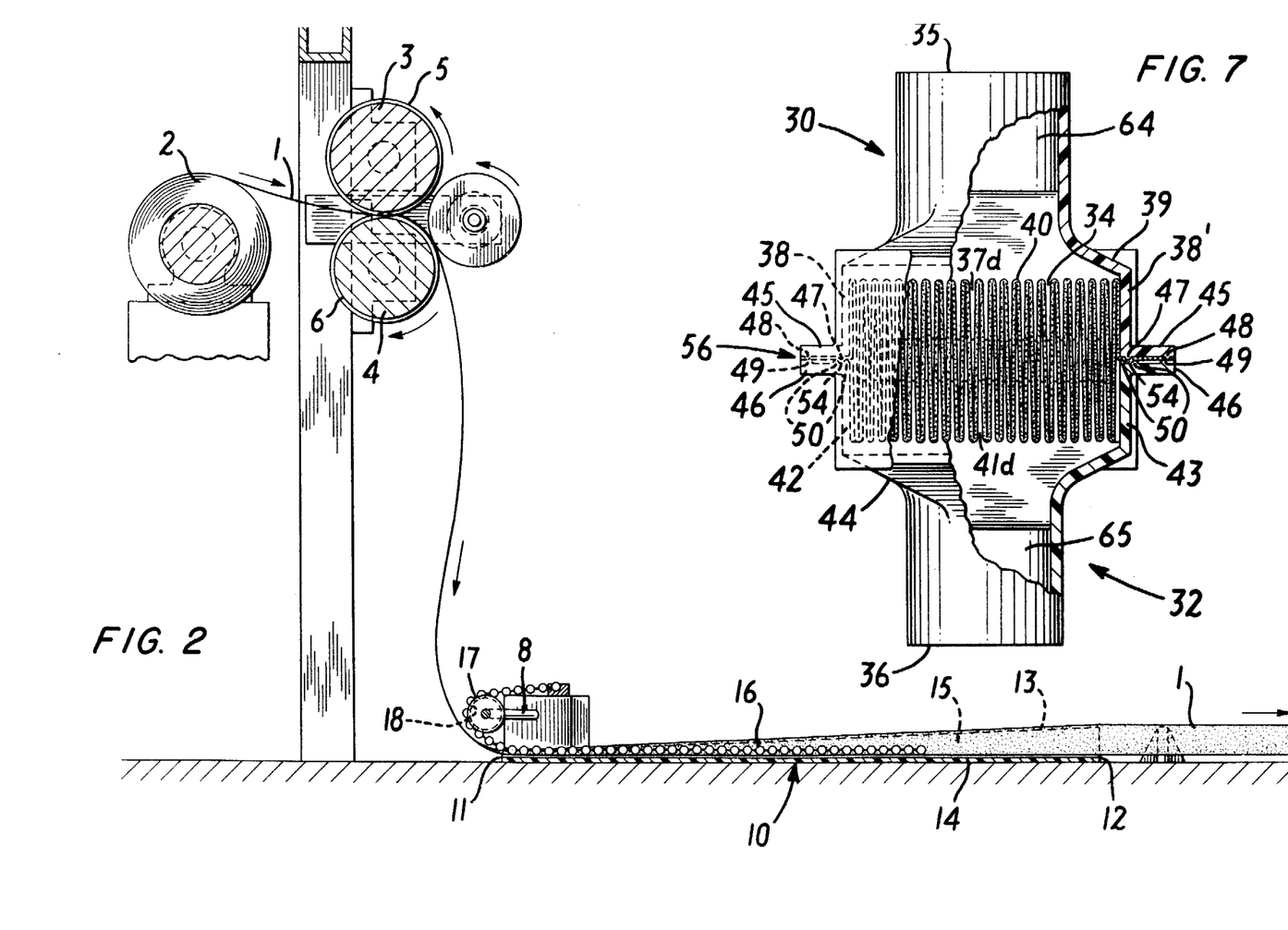
FIG. 2 represents a longitudinal sectional view of the fan-shaped fold-former, taken along the line 2—2 of FIG. 1, and looking in the direction of the arrows.
FIG. 7 is a cross-sectional view through a finished housing carrying a filter element after sealing and after having been cut off from the strip shown in FIG. 6.
Figure 3:
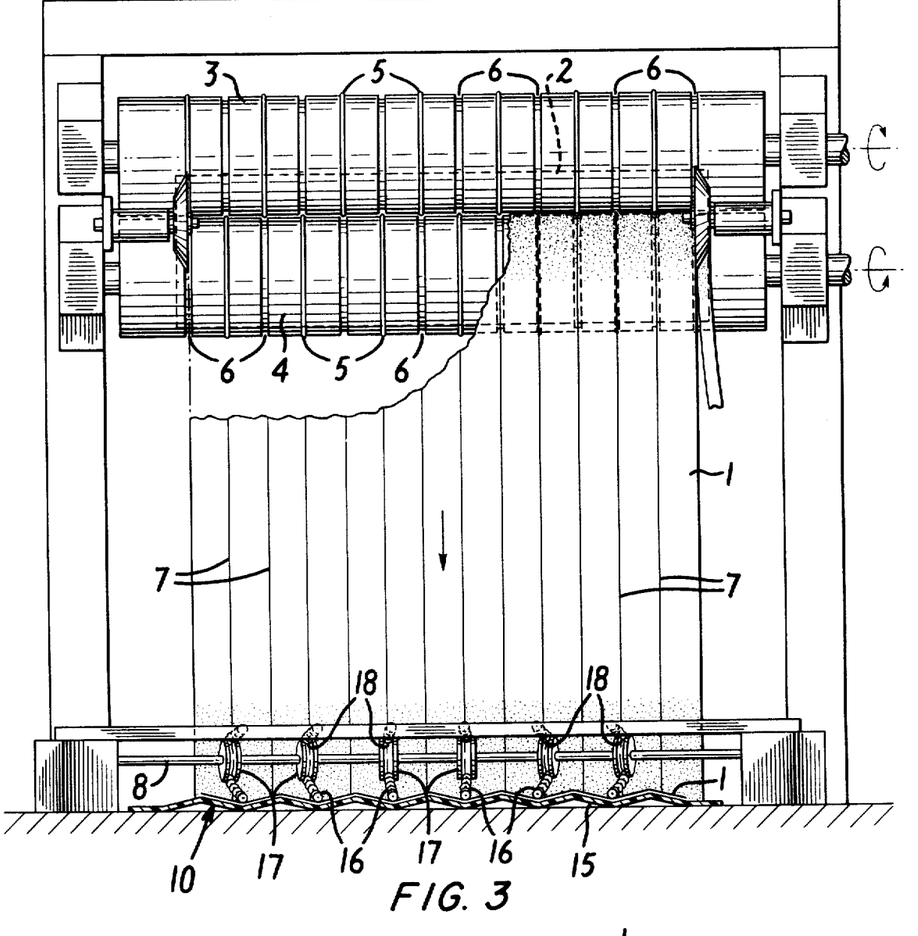
FIG. 3 represents a cross-sectional view of the fan-shaped fold-former of FIG. 1, taken along the line 3—3 of FIG. 1 at the inlet end thereof, and looking in the direction of the arrows.
Figure 4:
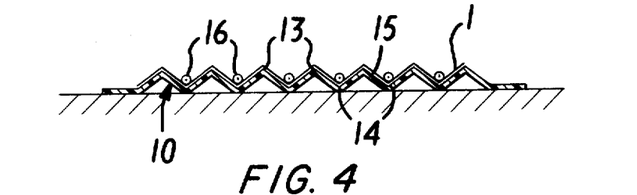
FIG. 4 represents a cross-sectional view of the fan-shaped fold-former of FIG. 1, taken along the line 4—4 of FIG. 1 at the central portion thereof, and looking in the direction of the arrows.
Figure 5:
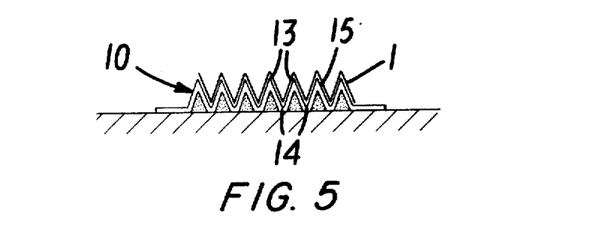
FIG. 5 represents a cross-sectional view of the fan-shaped fold-former of FIG. 1, taken along the line 5—5 of FIG. 1 at the outlet end thereof, and looking in the direction of the arrows.
Figure 8:
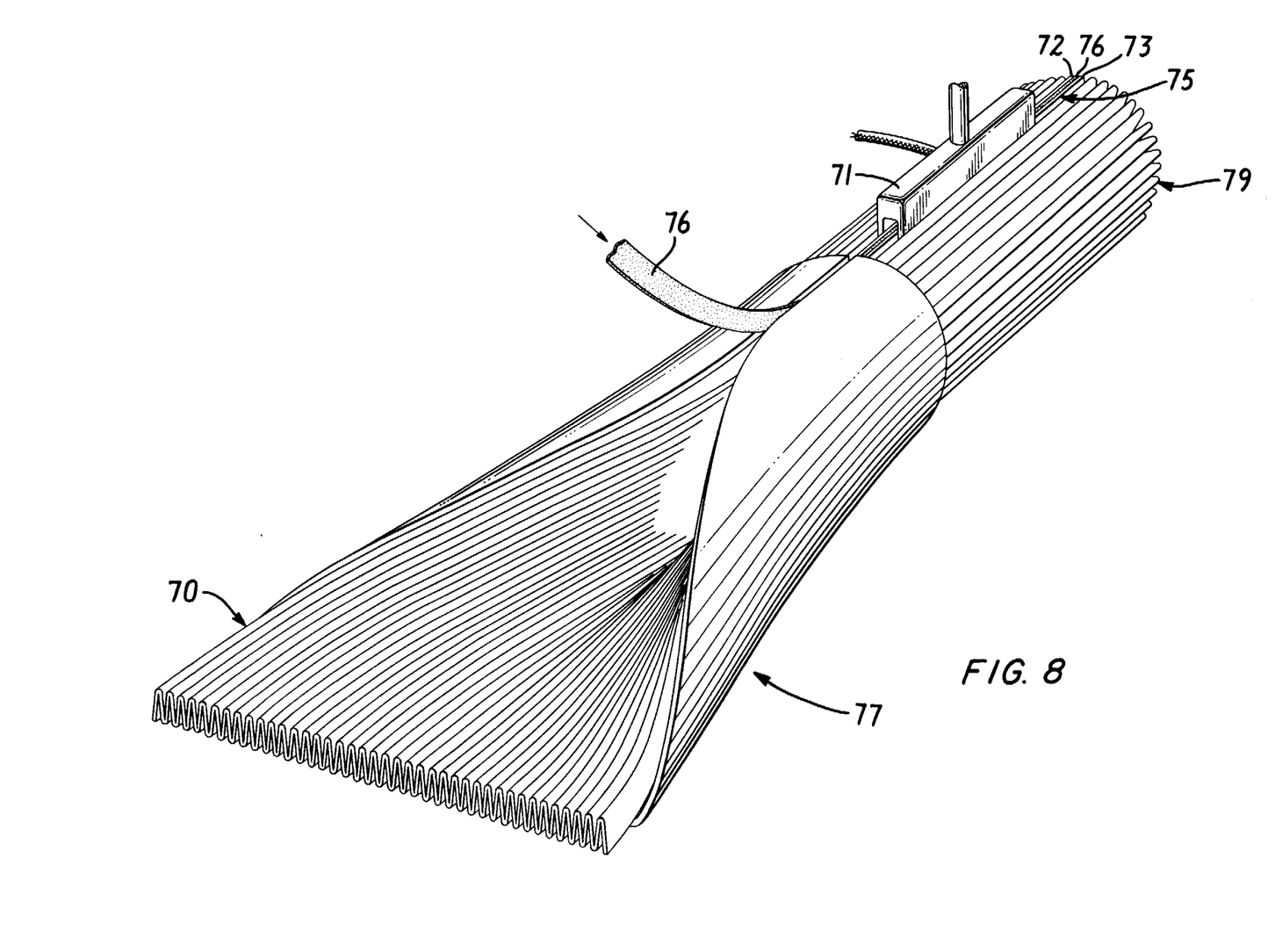
FIG. 8 is a perspective view of a fold-former for sequential combination with the apparatus of FIGS. 1 to 5, folding the corrugated filter sheet material as obtained into a cylindrical form, and applying a bonding agent to the longitudinal side seam seal formed in the lapping over of the edges of the folded filter sheet, with means for cutting off the formed corrugated filter cylinder into selected lengths.

The corrugated sheet can be housed directly in a filter housing, as illustrated in FIGS. 6 and 7, or after forming into a corrugated cylinder, as illustrated in FIG. 8.

Inasmuch as the corrugated sheet material is corrugated longitudinally, it is available in very long lengths, limited only by the characteristics of the performed strip, and even in continuous lengths if the strip is continuously formed as a preliminary to corrugation. Consequently, the corrugated filter sheet is adapted to being housed in filter housings in like manner.

As illustrated in FIGS. 6 and 7, filter housings in two parts, arranged to clasp the filter sheet material across the housing between the two parts, can also be formed from endless strips, and then after bonding to the corrugated filter sheet can be cut off in lengths, as desired. It is however usually convenient to have the filter housing portions pre-cut in finite lengths, but feed the filter housings closely juxtaposed, one after the other, in alignment, so as to continuously embrace the length of corrugated filter sheet material therebetween. The housing portions can then be bonded together, with the filter material bonded to one of the portions, or to both, and the filter sheet then cut off in the space between abutting filter housing sections. An apparatus capable of doing this is shown in FIGS. 6 and 7, and illustrated in the assembly of the type of filter assembly described and claimed in U.S. Pat. No. 4,187,182, patented Feb. 5, 1980 (now Ser. No. 926,767, filed July 21, 1978, which stands allowed), the disclosure of which is incorporated by reference.

In this arrangement, filter housing halves 30 (which may be formed of molded plastic) are fed continuously onto the strip from above by way of the guide 31, while mating filter housing halves 32 (which may be formed of molded plastic) are fed against the filter sheet from below by way of the guide 34, and brought into juxtaposition. These filter housing halves, as seen in FIGS. 6 and 7, are of a generally channel-like configuration, each having two open ends and at least two opposed sides defining therebetween a fluid chamber extending between the corrugated filter sheet and one fluid port. When assembled, the corrugated filter sheet extends across the fluid chamber across the line of fluid flow between the fluid ports. The filter is held in a fluid-tight seal extending the length of the inner side walls at opposed side portions of the filter element between an edge of the inner side walls and another portion of the housing. Each housing portion also has longitudinally extending comb means interdigitatedly inserted between the corrugation folds of the filter, having tynes of a width substantially equal to the spacing between corrugation folds, and a length substantially equal to half the depth of the corrugation folds; the comb means and inner side walls of each housing portion together holding the sides and corrugation folds of the filter element, positioning the filter element across the fluid chamber, supporting the folds against displacement in any direction, and sealing all the sides of the filter element to the housing, so that the fluid flow between the fluid ports must pass through the filter element. The filter housing when assembled also has side caps extending along the sides of the filter element and bonded in a fluid-tight seal thereto, which complete the enclosure of the filter assembly.

In a preferred embodiment, the mating sections of the first and second housing portions engage and grip edge portions of opposed sides of the filter element. They can be integrated through the pores of the filter element in a fluid-tight seal, if desired, but this is unnecessary.

In a preferred embodiment, the disposable filter assembly is a box cube, and substantially square-sided. However, any type of box shape can be used.

In a preferred embodiment, the comb means is molded as an integral part of each housing portion. While a central comb means is in some cases sufficient, the comb means preferably is disposed both centrally and at each side of the housing portions, to engage the corrugation folds at their side ends, as well as at a central portion. The comb means can also be individually formed, and attached to or bonded to the housing portion.

Since the first and second housing portions 30,32 are open at their sides until the side caps are put on, the housing portions can be fed at the angle shown in FIG. 6 to gradually enter the comb tynes interdigitatingly between the corrugation folds and fit them snugly therein so that a fluid-tight seal to the corresponding sides of the filter element is obtained when the mating sections thereof are bonded together at the mating flanges 45,46, which is done before the filter sheet 1 has been severed. Then, after severing, so that each individual filter assembly can be removed from the line, the sides of the filter element are sealed off by molding or potting the caps in situ using a hot-melt of a thermoplastic capping material. The result is that in the finished assembly all sides of the filter element are sealed to the sides of the housing, on one set of opposed sides to the side caps, and on the other opposed sides to the first and second housing portions, so that all fluid flow between the fluid ports must pass through the filter element.

As best seen in FIG. 7, the housing portions 30,32 define a fluid chamber 34 therewithin. A fluid port 35 is at the base of housing portion 30, and a fluid port 36 is at the base of housing portion 32. It will be seen that these ports are coaxial. One port serves as a fluid inlet and the other as a fluid outlet; fluid flow can be from either direction since the corrugated filter sheet 40 has opposite sides that are the same. Housing portion 30 has as an integral molded part thereof spaced three combs 37a, 37b, 37c, one at each end and one in the central portion thereof, having tynes 37d and housing portion 32 has as an integral molded part thereof three combs 41a, 41b, 41c, having tynes 41d. These serve as supports extending between and spacing the corrugation folds of the filter sheet 40 serving as the filter element, disposed at the ends and center of the folds, and extending the depth of each fold, from the tip to the base.

Housing portion 30 has opposed sides 38 and 38' extending outwardly from the base portion 39, and housing portion 32 has opposed sides 42 and 43 extending outwardly from base portion 44. Each of sides 38, 38' of portion 30 terminates in an outwardly extending flange 45, and each of sides 42,43 of portion 3 terminates in an outwardly extending flange 46. Each flange 45 has two sets of single ribs 47,48, and each flange 46 has one single rib 49 and one double rib 50 with a slot 54 therebetween, into which ribs 47 fit. The sides of the filter element 1 are engaged by ribs 47,50 and so retained in position.

The ribs 48,49 are bonded together to hold the housing portions together at the flanges 45,46 as one piece. Such a bond can be obtained, for example, by ultrasonic welding, by solvent softening, or by heat-fusion. In this way two of the four sides of the filter element 1 are sealed to the side caps, and two are held in the bite between ribs 47,50 of the housing parts. This closes off all four side edges of the filter sheet to fluid flow, and restricts flow between the two portions of the fluid chamber 34 in the housing to that via the pores of the filter element 1. Thus, all flow between the fluid ports 35 and 36 of the housing must pass through the filter.

The filter element 1 can be of any filter sheet material. The element shown is made of microporous plastic membrane sheet, such as nylon, cellulose acetate or polypropylene membrane. Plastic or wire mesh, such as polyester mesh fabric, or stainless steel wire mesh, or epoxy-impregnated paper, or a supported nylon membrane, as well as other types of sheet filter elements, can also be used. The filter element is in corrugated form, for an increased surface area in the limited space of fluid chamber 34.

It will be seen on reference to FIG. 7 that the side sections 38,38', 42,43 of each housing portion 30,32 have a special construction which ensures a fluid-tight seal between the housing portions when they are bonded together. The flanges 45 of the opposed sides 38,38' of housing portion 30 meet the flanges 46 of the sides 42,43 of the other housing portion 32. Flanges 45 of portion 30 have one pair of ribs 47,48 and flanges 46 of portion 32 have one set of single ribs 49 and one pair of ribs 50 receiving ribs 47 therebetween, the ensure that the portions 30,32 fit snugly together in the correct position to hold the filter sheet 1 in place.

After portions 30 and 32 are fitted together, with ribs 47,50 and 48,49 abutting, the ribs 48,49 are readily fused together to produce an integral one-piece structure at the seal 56 (FIG. 7). Internally of the ribs 48,49 are the ribs 47,50, which retain the filter element sides in their bite. The ribs 48,49 are then integrated by ultrasonic welding apparatus 60 forming a fluid-tight seal therebetween, and closing off these two sides of the filter element to fluid flow. The filter sheet 1 between the assembled housings are then cut by cutters 61.

Next, the side caps are formed in situ or preformed and bonded across the openings 58,59 to the housing portions 30 and 32 and to the filter element edges 62,63, bonding the filter element sides to the side caps, and completing the fixing of the four side edges of the filter element in place in the fluid chamber. This can be done using, for example, an adhesive or a melt of adhesive or resin, or a potting composition. The filter assembly is now complete, and ready for use.

The filter assembly is operated in-line, as follows: Fluid flow can be in either direction. Fluid enters at port 35, for example, and enters chamber portion 64, then flows through the filter 1 and enters chamber portion 65, whence it emerges from the housing via port 36.

Line connections can be made at ports 35,36 in any desired manner. For medical use, Luer-loks can be used.

While the combs 37a,37b,37c,41a,41b,41c are shown as an integral part of the housing portions, and this is preferred, they can also be separately formed and inserted in slots or otherwise fitted to and attached to the housing portions. If fluid flow is to be only in one direction through the filter at all times, the combs can be restricted to the downstream side of the filter sheet.

The effect of the uniform corrugations, maintained by the combs, upon pressure drop and flow rate is remarkable and entirely unexpected. In use in the filtration of gases, for example, the flow rates are approximately doubled, and the pressure drop cut in half. This effect cannot be attributed solely to the prevention of collapse of the corrugation folds one upon the other, but is evidently a function almost entirely of the uniformity in the spacing. The combs clearly fix a uniform spacing of the corrugated filter sheet in the box housing. Evidently, in the absence of combs, the filter corrugations assume a nonuniform spacing which has an adverse effect upon flow rate, the flow rate being slower in the narrower spaces and larger in the more open spaces. This may lead to turbulence and other unusual flow conditions, which may further inhibit flow.

The filter housing portions, combs if separate from the housing, and side caps can be made of any synthetic plastic material. Thermoplastic or solvent-soluble plastic materials are preferred because of the ease of bonding, but it is also possible to use thermosetting resins in a thermoplastic, fusible, or heat-softenable stage of polymerization, until the bondings have been effected, after which the curing of the resin can be completed to produce a structure which can no longer be separated. Such a structure is autoclavable without danger of destroying the fluid-tight seal between the housing portions and the filter element and the side caps and the filter element. Thermoplastic resins whose softening point is sufficiently high so that they are not softened under sterilizing autoclaving conditions are preferred for medical use. Exemplary of the plastic materials which can be used are polyethylene, polypropylene, polybutylene, polyisobutylene, polyamides, polyvinyl chloride, polyvinylidene chloride, polyacrylonitrile, polyesters, polycarbonates, polymethyl methacrylate, polyallyl, and polyoxymethylene resins. Polytetrafluoroethylene and polytrifluorochloroethylene can also be used.

Any filter element can be used, but it is usually preferred for medical purposes that the pore size of the filter element be less than 50 microns, and preferably less than 0.3 microns where the passage of bacteria through the filter assembly is to be prevented. Filter sheets which are incapable of passing bacteria include membrane filters and filter sheets described in U.S. Pat. Nos. 3,238,056, dated Mar. 1, 1966, 3,246,767, dated Apr. 19, 1966, 3,353,682, dated Nov. 21, 1967, and 3,573,158, dated Mar. 30, 1971 to Pall et al.

Also useful are metallic filter sheet materials, such as woven or nonwoven wire mesh, for instance, stainless steel screen, and stainless steel wire mats. Metal filter sheets are readily bonded to plastic housing materials in a fluid-tight seal by fusion or potting techniques, or by use of adhesives.

Such box filter assemblies have wide medical uses, and can be used, for example, in the filtration of blood, in blood transfusions, and in extracorporeal transfusion operations, where the blood must be circulated through a filter before being returned to the body. The filters can be used in lines administering fluids and gases of all sorts to a patient, such as, for example, a breathing filter to isolate the patient from an inhalation therapy apparatus, and in the filtering of fluids for intravenous administration, as well as any use where a small extended area disposable filter is needed with a substantial filter surface in a small space.

As best seen in FIG. 8, the corrugated filter sheet can also be folded into cylindrical form by passage through a former 70. The former is so shaped that the sheet is folded over on itself in cylindrical form, with the edges 72,73 lapped over to form a longitudinal side seam seal 75. The application of a strip of adhesive 76 to these edges just before the lapping makes it possible to bond the edges together. The adhesive is then cured and the seal made permanent by passing the finished cylinder through the heat-sealing element 71. As a result, a corrugated filter cylinder is continuously formed in a virtually endless length. This cylinder 79 can then be cut off in selected lengths, and the lengths end-capped in conventional fashion, using, for example, preformed end-caps, which are bonded to the open ends using an adhesive or bonding agent, or by potting the open ends, in the manner of the filter elements shown in FIGS. 6 and 7.

The process and apparatus of the invention are capable of corrugating any flexible porous sheet material having pores extending from surface to surface. One or several layers of the same or varying porosity, and one or more of which may act as prefilters, can be corrugated in juxtaposition, or bonded together. Additional supporting or protective layers such as open-weave meshes may be added, to permit free flow of fluid up and/or downstream of the fine filter layer.

Paper, which can, if desired, be resin impregnated, is a preferred base material, since it yields an effective, versatile and inexpensive fluid-permeable filter medium. The invention is, however, applicable to papers and like sheet materials formed of any type of fiber, including not only cellulose fibers but also synthetic resin fibers and fibers of other cellulose derivatives including, for example, fibers of polyvinyl chloride, polyethylene, polypropylene, polyvinylidene chloride, cellulose acetate, cellulose acetate propionate, viscose rayon, polyacrylonitrile, polymers of terephthalic acid and ethylene glycol, polyamides, and protein fibers of various sorts, such as zein and the alginates, glass, asbestos, potassium titanate, mineral wool, polystyrene, rubber, casein, hemp, jute, linen, cotton, silk, wool, and mohair. Also useful, in addition to papers, are textile fabrics, and woven and nonwoven fibrous layers of all kinds such as felts, mats and bats made of fibrous materials of any of the types listed above, and plastic membrane sheets of any synthetic resin, such as polyamide, polyethylene, polypropylene, polysulfone, polysulfonamide, polyester, polyurethane, polycarbonate, and polyvinyl chloride. Plastic membranes having integral internal supporting layers such as nonwoven and woven fabrics are particularly suitable.

The sheet material should in most cases be sufficiently rigid to be self-supporting when folded in corrugated form, but it it is not, a rigid core of metal, plastic or other hard material can be provided as an internal and/or external support.

Also, the filter sheet material of which the filter elements of the invention are made can be, if desired, impregnated with a synthetic resin or cellulose derivative to increase its strength and resistance to wear by the fluid being filtered. The impregnating agent can be any material useful in the impregnation of papers and textile materials. Such materials are well known in the paper and textile arts, and form no part of the instant invention. The impregnating agents can be in liquid form, capable of undergoing solidification as by polymerization, cross-linking, or the like. They can also be in solid form, and applied to the base from a solution in an inert solvent, or as melts. Representative impregnating resins include phenol-formaldehyde resins, urea-formaldehyde resins, melamine-formaldehyde resins, polyester resins, and polyepoxide resins.

The bonding agent for sealing the corrugated sheet having portions and/or in a side seam seal can be of any synthetic resin or cellulose derivative. The thickness of the layer will be appropriate to the sheet filter material. A rough-surfaced material will require a thicker bonding agent tape than a smooth-surfaced material. Usually, a film of from 0.25 to 5 mm in thickness will be satisfactory.

Typical materials are polyvinyl chloride, polyvinylidene chloride, polyacrylonitrile, polyethylene, polypropylene, rubber, polymers of terephthalic acid and ethylene glycol, polyamides, cellulose acetate, ethyl cellulose, polyesters, polyepoxides, polystyrene, polyisobutylene, urea-formaldehyde, phenolformaldehyde, melamine-formaldehyde, polytetrafluoroethylene, and polytrifluorochloroethylene resins.

A thermoplastic or pressure-sensitive bonding agent can be bonded to the juxtaposed sheet surfaces by application of heat and pressure. A thermosetting resin such as the phenolformaldehyde, urea-formaldehyde, and polyepoxide resins can be used in an incompletely polymerized stage wherein they are still thermoplastic or pressure-senstive, and converted to a thermoset non-thermoplastic stage of polymerization under the application of heat and pressure so as to make a leak-proof seal that is also permanent.

In the case in which the sheet filter material is impregnated with an impregnating resin for greater strength, and the resin is in an incomplete stage of polymerization, the curing of the resin impregnant and of the resin tape can be effected simultaneously. The filter material also can be given an oven or like heat treatment after formation of the side seam seal, to complete the cure of any impregnant and of the tape bonding agent.

In lieu of the tape or ribbon, a fluid bonding agent or adhesive can be used, flowed into the space where bonding is to be effected. The cylinder is placed with this space uppermost, and the ends of the trough closed off with caps or other means to retain the fluid there until it hardens. Any of the materials named above for the tape or ribbon can be used, in molten condition, in solution, in a solvent, or in a liquid non- or partially-polymerized condition, and brought to a solid stage of polymerization thereafter.

Havng regard to the foregoing disclosure, the following is claimed as inventive and patentable embodiments thereof:

1. A corrugating apparatus capable of forming corrugated filter sheet by folding a long strip of plastic membrane sheet material into corrugations extending longitudinally of the strip, comprising, in combination:

(1) a fan-shaped fold-former supporting the sheet material being corrugated from side to side and from end to end during corrugation and drawing the sheet in from the sides towards the center and having an inlet end and an outlet end, the former having an undulating configuration corresponding in cross-section at the outlet end in height and width to the corrugations to be imposed on the sheet material; the undulations radiating outwardly in a fan shape and decreasing in height and increasing in width from the outlet end to the inlet end; the undulations at their inlet end being arranged in an arc described about the outlet end and having a radius of curvature corresponding to the distance from the inlet end to the outlet end of the undulations;

(2) arcuate guide means for the strip of sheet material disposed before the inlet end of the undulations in the horizontal plane of the fold-former and having a curvature corresponding thereto;

(3) means disposed above the arcuate guide means for feeding a long strip of sheet material from above in substantially vertical descent to the arcuate guide means at the inlet end of the undulations at a rate sufficient to maintain the strip of sheet material at zero tension and slack throughout its width at the arcuate guide means;

(4) means before the arcuate guide means for press-bending the sheet material alternately on opposite sides thereof along the fold lines of the corrugations to be imposed, to facilitate bending back and forth in zig-zag fashion along those lines in the fold-former; and (5) means disposed beyond the outlet end of the fold-former for drawing the sheet material through the fold-former with minimum frictional drag while corrugating the sheet material therein.

2. A corrugating apparatus in accordance with claim 1 in which the means for press-bending the sheet material along the fold lines comprises a pair of embossing rolls each carrying in their bite mating circumferential alternating raised and grooved portions extending along the press-bend lines on each face of the sheet material.

3. A corrugating apparatus in accordance with claim 1 comprising means for compelling the sheet to conform to the raised and depressed portions of the undulations along the fold former, to ensure that the sheet material is shaped to the corrugated shape of the fold former.

4. A corrugating apparatus in accordance with claim 3 in which the means for compelling the sheet to conform remains stationary and is shaped to engage the sheet with low frictional drag.

5. A corrugating apparatus for forming corrugated filter sheet by folding a long strip of sheet material into corrugations extending longitudinally of the strip, comprising, in combination:

(1) a fan-shaped fold-former drawing the sheet in from the sides towards the center and having an inlet end and an outlet end, the former having an undulating configuration corresponding in cross-section at the outlet end in height and width to the corrugations to be imposed on the sheet material; the undulations radiating outwardly in a fan shape and decreasing in height and increasing in width from the outlet end to the inlet end; the undulations at their inlet end being arranged in an arc described about the outlet end and having a radius of curvature corresponding to the distance from the inlet end to the outlet end of the undulations;

(2) arcuate guide means for the strip of sheet-material disposed before the inlet end of the undulations and having a curvature corresponding thereto;

(3) means for feeding a long strip of sheet material to the arcuate guide means at the inlet end of the undulations at a rate sufficient to maintain the strip of sheet material at zero tension and slack throughout its width at the arcuate guide means;

(4) means before the arcuate guide means for press-bending the sheet material along the fold lines of the corrugations to be imposed, to facilitate bending along those lines in the fold-former;

(5) means for compelling the sheet to conform to the raised and depressed portions of the undulations along the fold-former by the weight of the means upon the sheet, said means being stationary and shaped to engage the sheet with low frictional drag to ensure that the sheet material is shaped to the corrugated shape of the fold-former; and (6) means disposed beyond the outlet end of the fold-former for drawing the sheet material through the former with minimum frictional drag while corrugating the sheet material therein.

6. A corrugating apparatus for forming corrugated filter sheet by folding a long strip of sheet material into corrugations extending longitudinally of the strip, comprising, in combination:

(1) a fan-shaped fold-former drawing the sheet in from the sides towards the center and having an inlet end and an outlet end, the former having an undulating configuration corresponding in cross-section at the outlet end in height and width to the corrugations to be imposed on the sheet material; the undulations radiating outwardly in a fan shape and decreasing in height and increasing in width from the outlet end to the inlet end; the undulations at their inlet end being arranged in an arc described about the outlet end and having a radius of curvature corresponding to the distance from the inlet end to the outlet end of the undulations;

(2) arcuate guide means for the strip of sheet-material disposed before the inlet end of the undulations and having a curvature corresponding thereto;

(3) means for feeding a long strip of sheet material to the arcuate guide means at the inlet end of the undulations at a rate sufficient to maintain the strip of sheet material at zero tension and slack throughout its width at the arcuate guide means;

(4) means before the arcuate guide means for press-bending the sheet material along the fold lines of the corrugations to be imposed, to facilitate bending along those lines in the fold-former;

(5) stationary chain means having a smooth surface for compelling the sheet to conform to the raised and depressed portions of the undulations along the fold-former while minimizing frictional drag and also injury to the surface of the sheet material, and ensuring that the sheet material is shaped to the corrugated shape of the fold-former; and (6) means disposed beyond the outlet end of the fold-former for drawing the sheet material through the former with minimum frictional drag while corrugating the sheet material therein.

7. A corrugating apparatus in accordance with claim 1 comprising means for folding the corrugated sheet into cylindrical form, and means for lapping and bonding the edges of the cylinder in a side seam seal.

8. A corrugating apparatus in accordance with claim 1 comprising guide means for guiding filter housing portions onto each side of the corrugated sheet, and then bonding the housing portions together and to the filter sheet to form a filter assembly.

9. A corrugating apparatus in accordance with claim 1 comprising means for severing the corrugated strip into selected lengths of corrugated filter sheet material.

10. A process for forming corrugated filter sheet by folding a long strip of sheet material into corrugations extending longitudinally of the strip, comprising, in combination, and in the stated sequence, the steps of:

(1) press bending the sheet on each side along the longitudinal fold lines of the intended corrugations;

(2) feeding the sheet from above in substantially vertical descent at a rate sufficient to maintain the sheet at zero tension and slack throughout its width, (3) causing the sheet to turn through an arc of substantially 90° from a vertical plane to the plane of the corrugation-forming step while bowing the sheet outwardly in a billow having a curvature in the plane of the corrugations corresponding to the arc described about the end point in the corrugating step where the corrugations are fully formed and spaced closest together; and (4) gradually drawing in the sheet from the sides towards the center while pushing the sheet out from each side along the fold lines so as to form the intended corrugations, reducing the width of the sheet according to the height and width of the corrugations, and while supporting the sheet material being corrugated from side to side and from end to end during corrugation.

11. A process for forming corrugated filter sheet in accordance with claim 10, comprising cutting off selected lengths of the corrugated strip to form corrugated filter sheet suitable for forming filter elements.

12. A process for forming corrugated filter sheet in accordance with claim 10, which comprises folding the corrugated sheet into cylindrical form, and then lapping and bonding the edges of the cylinder in a side seam seal.

13. A process for forming corrugated filter sheet in accordance with claim 10 which comprises guiding filter housing portions onto each side of the corrugated sheet, and then bonding the housing portions together and to the filter sheet to form a filter assembly.

* * * * *